United States Patent
Saborit

(10) Patent No.: US 11,312,258 B2
(45) Date of Patent: Apr. 26, 2022

(54) ELECTRIC GENERATOR MOTOR SYSTEM

(71) Applicant: Juan Saborit, Mount Carmel, PA (US)

(72) Inventor: Juan Saborit, Mount Carmel, PA (US)

( * ) Notice: Subject to any disclaimer, the term of this patent is extended or adjusted under 35 U.S.C. 154(b) by 0 days.

(21) Appl. No.: 17/037,964

(22) Filed: Sep. 30, 2020

(65) Prior Publication Data

US 2022/0097545 A1  Mar. 31, 2022

(51) Int. Cl.
  *B60L 53/50* (2019.01)
  *F01B 17/02* (2006.01)
  *B60L 50/60* (2019.01)
  *H02K 11/00* (2016.01)
  *H02K 7/00* (2006.01)

(52) U.S. Cl.
  CPC .............. *B60L 53/50* (2019.02); *B60L 50/60* (2019.02); *F01B 17/02* (2013.01); *H02K 7/006* (2013.01); *H02K 11/0094* (2013.01)

(58) Field of Classification Search
  CPC ......... B60L 53/50; B60L 50/60; H02K 7/006; H02K 11/0094; F01B 17/02
  USPC ................... 290/16; 180/302; 60/414, 416
  See application file for complete search history.

(56) References Cited

U.S. PATENT DOCUMENTS

| | | | |
|---|---|---|---|
| 1,902,124 A | 3/1933 | Halloran | |
| 4,163,367 A * | 8/1979 | Yeh | B60L 50/30 60/414 |
| 4,355,508 A * | 10/1982 | Blenke | B60K 6/12 60/416 |
| 4,596,119 A | 6/1986 | Johnson | |
| 5,460,239 A * | 10/1995 | Jensen | B60L 58/30 180/302 |
| 6,006,519 A * | 12/1999 | Hormell, Jr. | F01B 17/00 418/61.2 |
| 6,311,797 B1 * | 11/2001 | Hubbard | B60K 3/00 180/165 |
| 6,629,573 B1 * | 10/2003 | Perry | B60K 3/02 180/165 |
| 7,828,091 B2 * | 11/2010 | Wedderburn, Jr. | B60K 16/00 180/2.2 |
| 8,225,900 B2 * | 7/2012 | Domes | B60L 50/62 180/302 |
| 8,342,283 B2 * | 1/2013 | Rolfe | B60L 8/003 180/302 |
| 8,561,747 B2 * | 10/2013 | Domes | B60K 6/00 180/302 |
| 8,893,488 B2 | 11/2014 | Shofner, II | |

(Continued)

FOREIGN PATENT DOCUMENTS

WO  WO2009094596  7/2009

*Primary Examiner* — Pedro J Cuevas

(57) ABSTRACT

An electric generator motor system for powering a vehicle and generating power includes a plurality of batteries and an electric converter in operational communication with the plurality of batteries. An electric drive motor is in operational communication with the electric converter. The electric drive motor propels a vehicle. A compressor is in operational communication with the electric converter. A plurality of air tanks is in operational communication with the compressor. An air motor is in operational communication with the plurality of air tanks. An alternator is in operational communication with the air motor and is in operational communication with the plurality of batteries to charge each battery.

4 Claims, 3 Drawing Sheets

(56) References Cited

U.S. PATENT DOCUMENTS

| | | | |
|---|---|---|---|
| 8,996,222 B1* | 3/2015 | Penrod | B60L 8/006 |
| | | | 701/22 |
| 9,227,507 B2* | 1/2016 | Rolfe | B60L 50/90 |
| 9,855,835 B1* | 1/2018 | Sneddon | B60K 8/00 |
| 10,012,247 B2* | 7/2018 | Kay | B60T 1/08 |
| RE47,647 E * | 10/2019 | Domes | B60L 50/90 |
| 11,193,431 B2* | 12/2021 | Ward | F01K 13/02 |
| 11,203,342 B2* | 12/2021 | Kattoju | B60W 30/18127 |
| 2009/0229902 A1* | 9/2009 | Stansbury, III | B60K 25/10 |
| | | | 180/165 |
| 2010/0307847 A1* | 12/2010 | Lungu | B60L 50/30 |
| | | | 180/65.31 |
| 2018/0162382 A1* | 6/2018 | Colavincenzo | B60W 10/06 |
| 2021/0301740 A1* | 9/2021 | Ward | F01K 13/02 |

* cited by examiner

ELECTRIC GENERATOR MOTOR SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to power systems and more particularly pertains to a new power system for powering a vehicle and generating power.

(2) Description of Related Art Including Information Disclosed Under 37 CFR 1.97 and 1.98

The prior art relates to power systems. Known systems incorporate alternators with electric motors in vehicles to recuperate energy during deceleration. Other known systems incorporate compressed air to power the vehicle with an air powered engine as well as power plants to generate said compressed air. These systems, however, do not use an air motor to drive a compressor as well as an alternator to create power for an electric motor that drives the vehicle.

BRIEF SUMMARY OF THE INVENTION

An embodiment of the disclosure meets the needs presented above by generally comprising a plurality of batteries and an electric converter in operational communication with the plurality of batteries. An electric drive motor is in operational communication with the electric converter. The electric drive motor is configured to propel a vehicle. A compressor is in operational communication with the electric converter. A plurality of air tanks is in operational communication with the compressor. The plurality of air tanks is filled with compressed air by the compressor. An air motor is in operational communication with the plurality of air tanks. The air motor is powered by the compressed air within the plurality of air tanks. An alternator is in operational communication with the air motor. The alternator is driven by the air motor and is in operational communication with the plurality of batteries to charge each battery.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
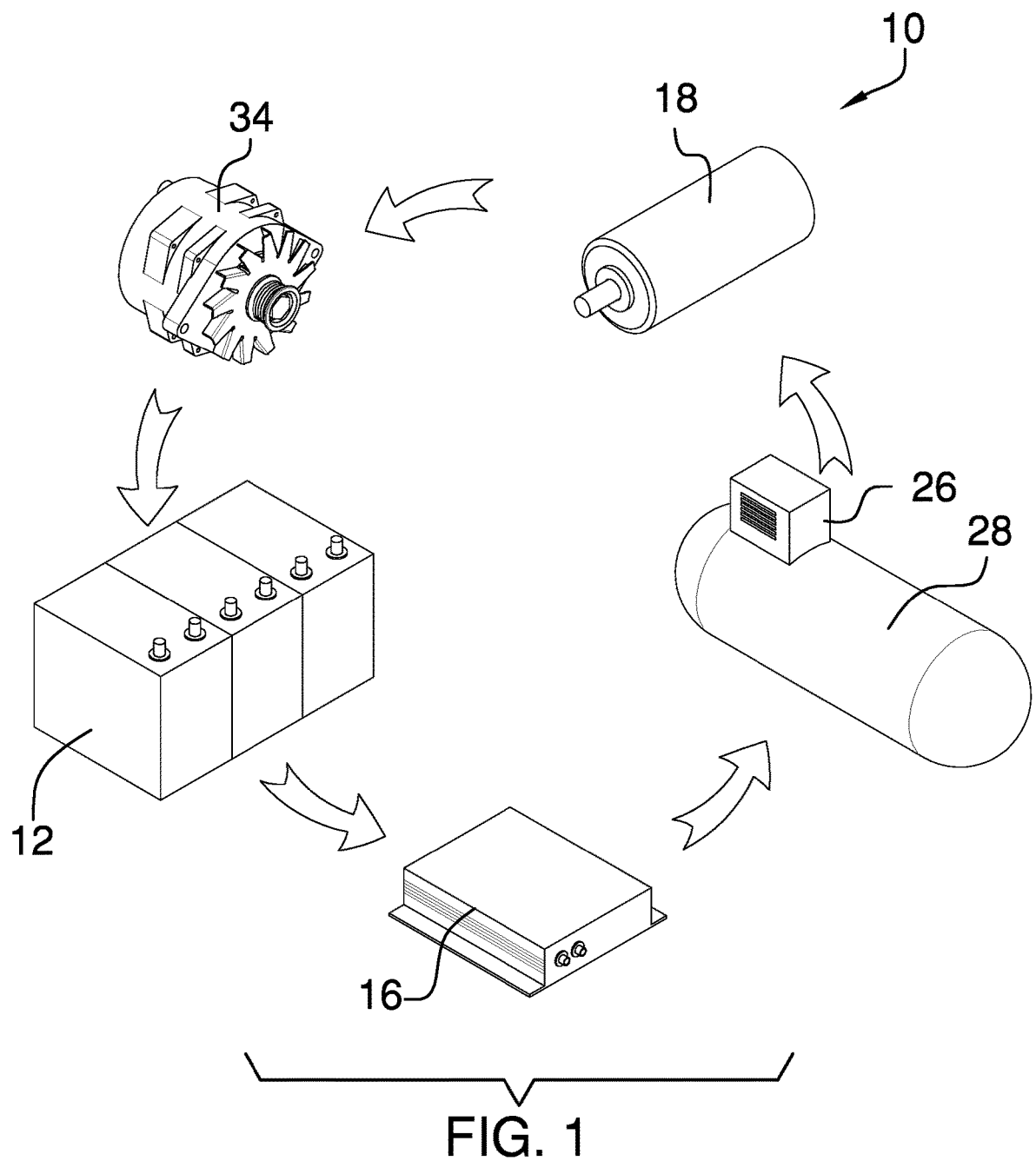
FIG. 1 is an isometric view of an electric generator motor system according to an embodiment of the disclosure.
Figure 2:
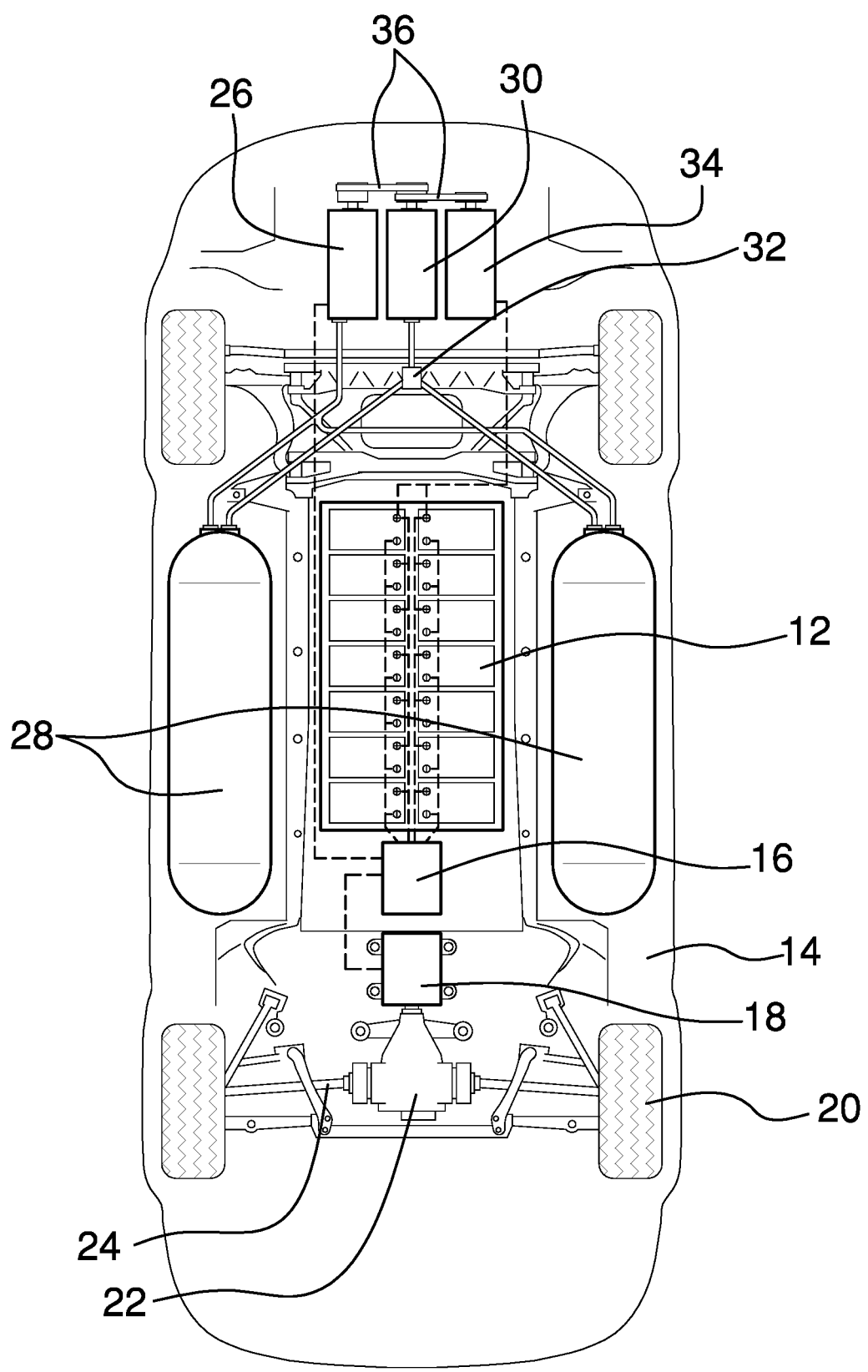
FIG. 2 is an in-use view of an embodiment of the disclosure.
Figure 3:
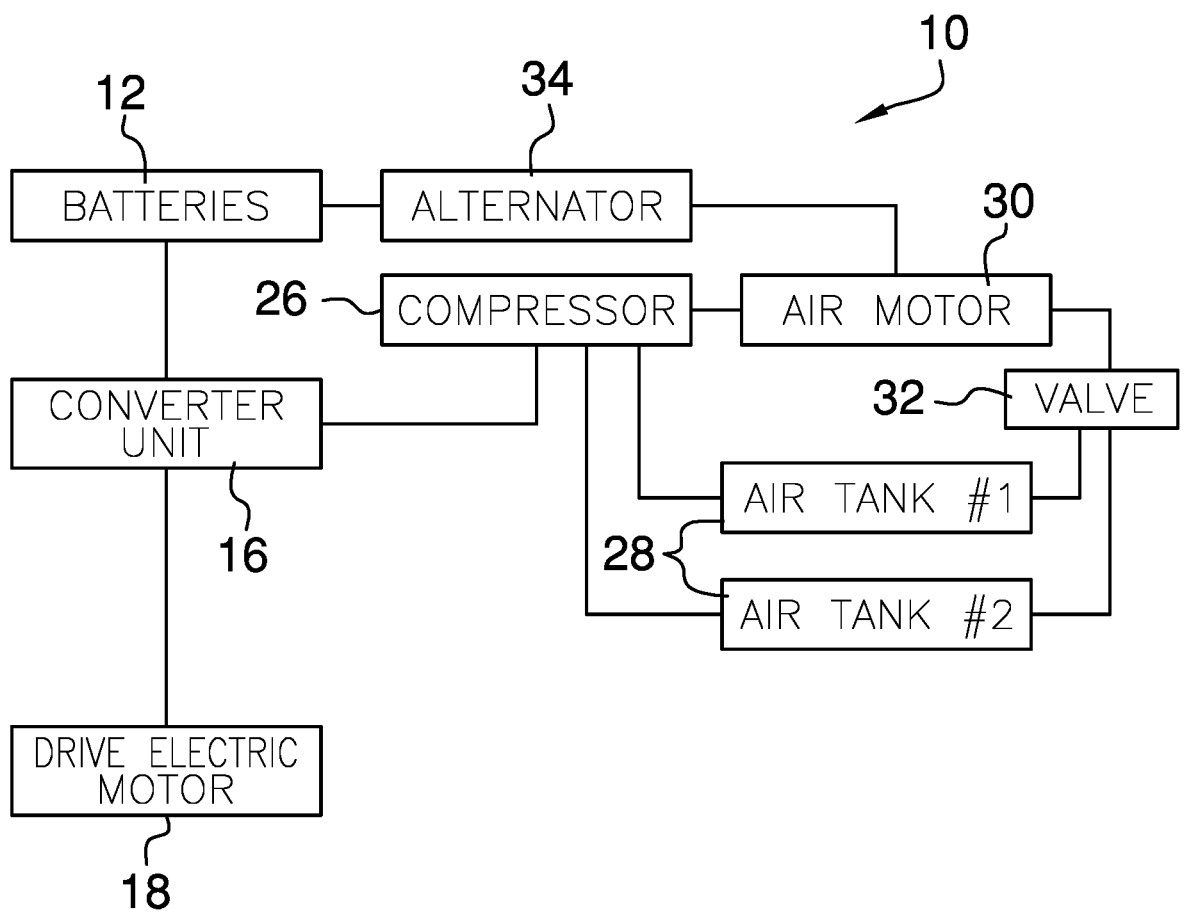
FIG. 3 is a block diagram of an embodiment of the disclosure.

With reference now to the drawings, and in particular to FIGS. 1 through 3 thereof, a new power system embodying the principles and concepts of an embodiment of the disclosure and generally designated by the reference numeral 10 will be described.

As best illustrated in FIGS. 1 through 3, the electric generator motor system 10 generally comprises a plurality of batteries 12. The plurality of batteries 12 may be arranged in an array and centrally positioned on a vehicle 14 to balance the center of gravity. An electric converter 16 is in operational communication with the plurality of batteries 12. The electric converter 16 converts direct current from the plurality of batteries to alternating current.

An electric drive motor 18 is in operational communication with the electric converter 16. The electric drive motor 18 is configured to propel the vehicle 14. Depending on the vehicle type there may be more than one electric drive motor 18 to individually power a wheel 20, a propeller, or other propulsion mechanism. The electric drive motor 18 may alternatively be in operational communication with a differential 22 to drive an axle 24 of the vehicle.

A compressor 26 is in operational communication with the electric converter 16 to utilize electric power to create compressed air. A plurality of air tanks 28 is in operational communication with the compressor 26 to be filled with the compressed air. The plurality of air tanks 28 may be a pair of obround air tanks 28 as seen in FIG. 2.

An air motor 30 is in operational communication with the plurality of air tanks 28. The air motor 30 is powered by the compressed air from within the plurality of air tanks 28. There may be a valve 32 in fluid communication with the pair of air tanks 28 and the air motor 30 to allow one air tank 28 to power the air motor while the other is being filled by the compressor 26. The pair of air tanks 28 may be positioned on opposite sides of the plurality of batteries 12 to maintain balance of the vehicle 14.

An alternator 34 is in operational communication with the air motor 30. The alternator 34 is driven by the air motor and is in operational communication with the plurality of batteries 12 to charge each battery 12. The compressor 26, the air motor 30, and the alternator 34 may be arranged parallel and adjacent to one another to allow for mechanical connection by a pair of pulleys 36.

In use, the electric generator motor system 10 powers the vehicle 14 while also generating power to eliminate or reduce the need to add an additional energy source. Inefficiencies and loss within the system may be compensated for by utilizing an external power source to charge the plurality of batteries 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:
1. An electric generator motor system comprising:
a plurality of batteries;
an electric converter in operational communication with the plurality of batteries;
an electric drive motor in operational communication with the electric converter, the electric drive motor being configured to propel a vehicle;
a compressor in operational communication with the electric converter;
a plurality of air tanks in operational communication with the compressor, the plurality of air tanks being filled with compressed air by the compressor;
an air motor in operational communication with the plurality of air tanks, the air motor being powered by the compressed air within the plurality of air tanks;
an alternator in operational communication with the air motor, the alternator being driven by the air motor and in operational communication with the plurality of batteries to charge each battery; and
the compressor, the air motor, and the alternator being arranged parallel and adjacent to allow for mechanical connection by a pair of pulleys.

2. The electric generator motor system of claim 1 further comprising the plurality of air tanks being a pair of air tanks; a valve being in fluid communication with the pair of air tanks and the air motor to allow one air tank to power the air motor while the other is being filled by the compressor.

3. The electric generator motor system of claim 1 further comprising each air tank being obround.

4. An electric generator motor system comprising:
a plurality of batteries;
an electric converter in operational communication with the plurality of batteries;
an electric drive motor in operational communication with the electric converter, the electric drive motor being configured to propel a vehicle;
a compressor in operational communication with the electric converter;
a plurality of air tanks in operational communication with the compressor, the plurality of air tanks being filled with compressed air by the compressor, the plurality of air tanks being a pair of air tanks; each air tank being obround;
an air motor in operational communication with the plurality of air tanks, the air motor being powered by the compressed air within the plurality of air tanks;
a valve being in fluid communication with the pair of air tanks and the air motor to allow one air tank to power the air motor while the other is being filled by the compressor; and
an alternator in operational communication with the air motor, the alternator being driven by the air motor and in operational communication with the plurality of batteries to charge each battery, wherein the compressor, the air motor, and the alternator are arranged parallel and adjacent to allow for mechanical connection by a pair of pulleys.

* * * * *